United States Patent [19]

Golwas et al.

[11] 4,128,361
[45] Dec. 5, 1978

[54] LOCKING MEANS FOR POSITIVE FEED DRILL

[75] Inventors: Robert F. Golwas, La Habra; Herman G. Feuerstein, Hacienda Hts. both of Calif.

[73] Assignee: Dresser Industries, Inc., Dallas, Tex.

[21] Appl. No.: 799,427

[22] Filed: May 23, 1977

[51] Int. Cl.² ........................... B23C 1/16; B23B 29/32
[52] U.S. Cl. .................................. 408/137; 74/813 L; 74/822
[58] Field of Search ............. 408/137; 74/813 L, 817, 74/822

[56] References Cited
U.S. PATENT DOCUMENTS 3,411,385  11/1968  Quackenbush ...................... 408/137
3,762,242  10/1973  Swezey ................................. 74/822

Primary Examiner—Othell M. Simpson
Assistant Examiner—Ula Chos
Attorney, Agent, or Firm—Roy L. Van Winkle; John N. Hazelwood

[57] ABSTRACT

The improved locking means includes a pair of shaft mounted gears that are in mesh with the thread on the exterior of the feed screw mounted in the housing of a positive feed drill. On the opposite ends of the shafts are mounted gears which rotate with the shafts. When the drill tool holder is not to be advanced, the gears and shafts rotate as the feed screw is being rotated and thus do not cause axial movement of the feed screw as the feed screw rotates. A rack gear is located in the housing adjacent the spur gears. A pressure actuated piston is provided to move the rack gear into engagement with the spur gears to lock the spur gears and shafts against rotation. When this occurs, the gears in mesh with the thread on the feed screw act as a fulcrum so that the feed screw and tool holder are moved axially as the feed screw rotates.

3 Claims, 4 Drawing Figures

LOCKING MEANS FOR POSITIVE FEED DRILL

BACKGROUND OF THE INVENTION

This invention relates to improvements in positive feed drills. More particularly, but not by way of limitation, this invention relates to an improved locking mechanism for ensuring positive feed of the drilling tool and tool holder during operation of the positive feed drill.

This invention is an improvement to the positive feed structure described in detail in U.S. Pat. No. 3,411,385 issued Nov. 19, 1968, to Robert C. Quackenbush. This invention also constitutes an improvement to somewhat similar tools that previously utilized half nuts to engage the feed screw during the drilling operation.

In the apparatus illustrated and described in U.S. Pat. No. 3,411,385, a pressure actuated braking system is illustrated in FIG. 8 that is utilized to lock the shafts carrying gears which engage the external thread on the feed screw to cause axial movement of the feed screw as it rotates in the drill housing. The apparatus of that patent has proved to be extremely successful, but on some occasions, when an extremely hard or tough material is being drilled, or when the drill bit has become dull, the torque imposed by the drill motor sometimes overcomes the braking system and results in stalling or variation of the feed rate of the drilling tool.

Accordingly, an object of this invention is to provide an improved locking mechanism that functions in conjunction with the feed screw, so that the drilling tool feed will not stall nor will the feed rate vary.

SUMMARY OF THE INVENTION

This invention provides an improved locking means for causing axial movement of the feed screw and tool holder relative to the housing that comprises: a shaft journaled in the housing and oriented therein generally perpendicular with respect to the feed screw; thread engaging means in engagement with the external thread in the feed screw, the thread engaging means being mounted on the shaft and rotatable therewith; a toothed gear mounted on the shaft and rotatable therewith; non-rotatable gear means having teeth thereon for mating with the toothed gear, the non-rotatable gear means being movable in the housing between the first position wherein the teeth are not in mating position and a second position wherein the teeth are in mating engagement thereby preventing rotation of the shaft and causing the feed screw and tool holder to move axially relative to the housing; and, means in the housing for moving the non-rotatable gear means between the two positions.

BRIEF DESCRIPTION OF THE DRAWING

The foregoing and additional objects and advantages of the invention will become more apparent as the following detailed description is read in conjunction with the accompanying drawings wherein like reference characters refer to like parts in all views and wherein.

DETAILED DESCRIPTION OF THE PREFERRED EMBODIMENT

Figure 1:
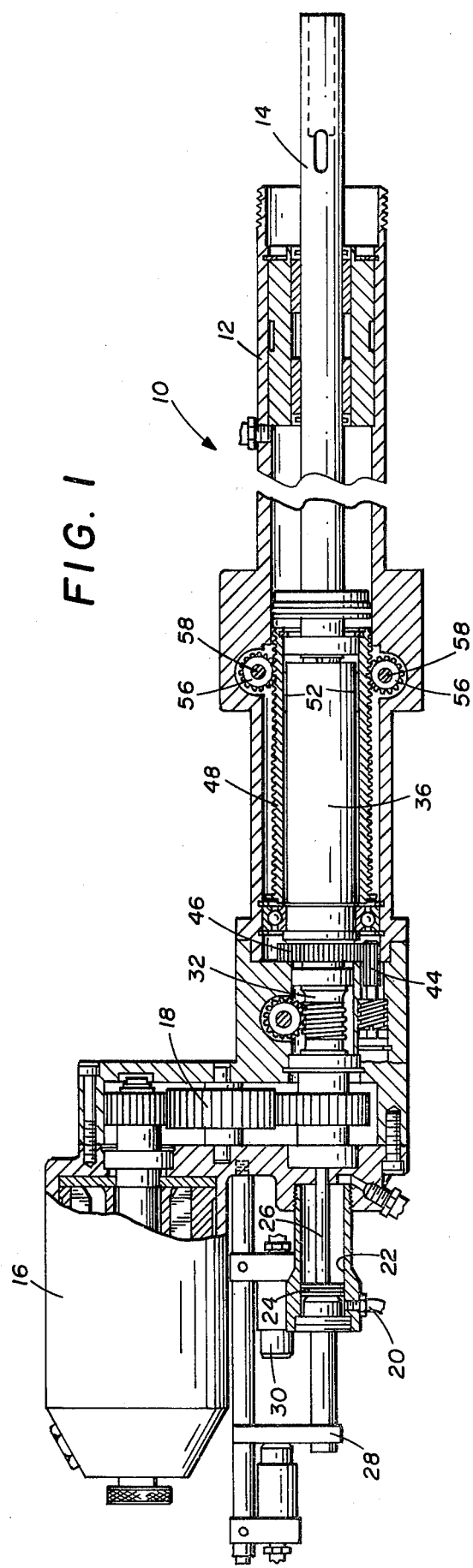
FIG. 1 is a view, partially in cross-section and partially in elevation, of a positive feed drill that includes improved locking means that is constructed in accordance with the invention.

Referring to the drawing, and to FIG. 1 in particular, shown therein and generally designated by the reference character 10, is a positive feed drill. The drill 10 includes a housing 12 that supports the drill holder 14 for both axial and rotational movement therein. Although not shown, it will be understood that the right end of the drill holder 14 as seen in FIG. 1, is arranged to accept any of a number of tools such as a counterbore, twist drill, or reamer, depending on the work to be performed.

Mounted on the upper left hand portion of the housing 12 is an air motor 16, which through a gear train 18 and other components to be described, causes the rotational movement of the tool holder 14. While the driving apparatus is illustrated as being an air motor, it should be obvious that any suitable apparatus providing rotation into the gear train 18 can be utilized if desired.

The drill 10 may be generally described as being a two-phase drill, that is, the tool and tool holder 14 are rapidly advanced to the working surface and upon reaching the working surface, a slower positive axial motion is imparted thereto. The initial rapid axial movement of the drill holder 14 is accomplished by supplying compressed air through a fitting 20 into a cylinder 22 which forms part of the housing 12. The air pressure forces piston 24 and piston rod 26 to the right, or axially with respect to the drill housing 12 very rapidly. Movement of the piston 24 carries a valve actuator member 28 therewith which will, upon reaching the end of the rapid movement, engage an air valve 30 which causes the previously mentioned slow positive axial motion of the tool holder 14 to occur.

Figure 2:
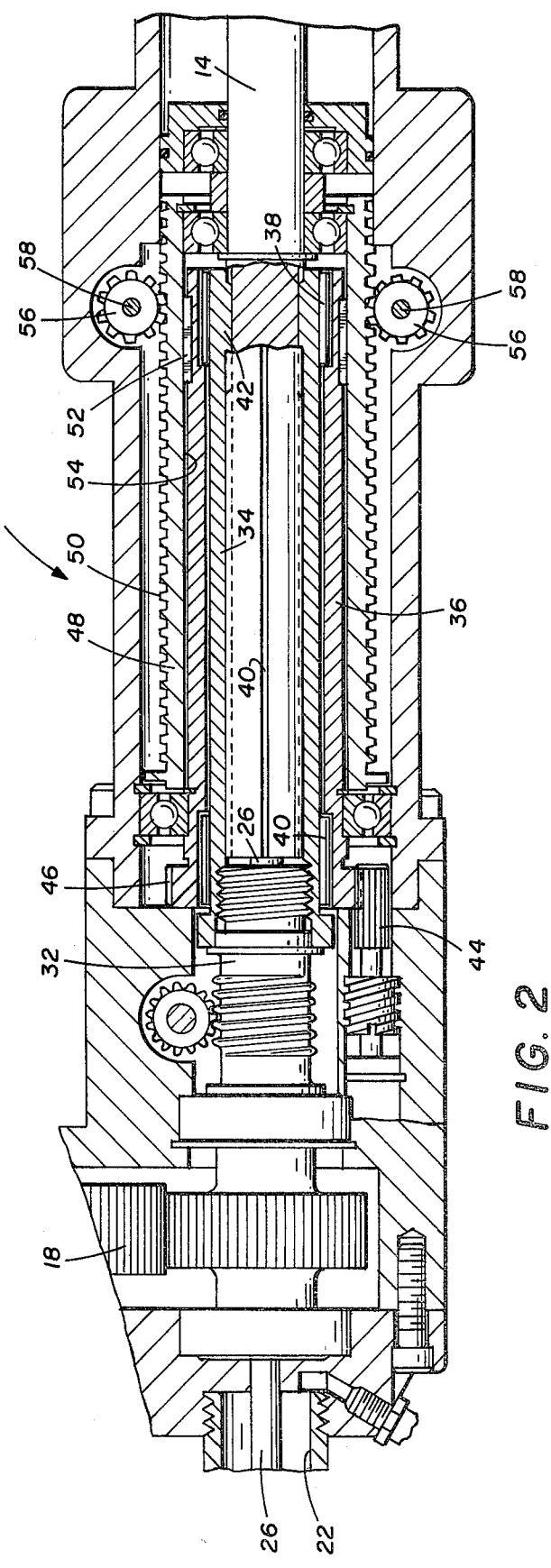
FIG. 2 is a fragmentary, enlarged view of a portion of the positive feed drill of FIG. 1 illustrating portions of the drill in more detail.

Rotational movement of the tool holder 14 may be more clearly understood by viewing FIG. 2. As shown therein, drive shaft 32, which forms part of the gear train 18, is threadedly connected to a hollow drive sleeve 34 that is journaled within a hollow feed screw drive sleeve 36 by bearings 38 and 40. It will be appreciated that the drive sleeve 34 cannot move longitudinally, thus, the tool holder 14 extends within the drive sleeve 34 and is provided on its exterior with a plurality of slots 40 that mesh with key portions 42 on the interior of the drive sleeve 34. The arrangement of the structure is such that axial movement of the tool holder 14 relative to the drive sleeve 34 is permitted as the keys 42 slide longitudinally along slots 40 and rotational movement is transmitted therebetween due to the engagement of the keys 42 with the tool holder 14.

Rotational movement is imparted to the feed screw drive sleeve 36 by a spur gear 44, which is part of the gear train 18, in mesh with a spur gear 46, which forms one end portion of the feed screw drive sleeve 36.

An elongated feed screw 48 encircles the feed screw drive sleeve 36 and is provided on its exterior with a helical thread 50 for purposes that will be described hereinafter. Rotation of the feed screw drive sleeve 36 is imparted to the feed screw 48 by the feed screw drive sleeve 36 through a plurality of keys 52 located therebetween. It should be pointed out that the keys 52 are located in slots 54 formed in the interior of the feed screw 48, so that the feed screw 48 can move axially relative to the feed screw drive sleeve 36 while rotation is being imparted thereto by the feed screw drive sleeve 36.

When the gear train 18 is rotating as a result of the operation of the motor 16, the tool holder 14 is rotating due to its direct connection with the shaft 32 and the feed screw 48 will likewise be rotating due to its connection through the gears 46 and 44 to the gear train 18. However, no longitudinal or axial motion of the feed screw 48 occurs at this time.

Near the right hand end of FIG. 2, there can be seen a pair of spaced gears 56 in mesh with the thread 50. Each of the gears 56 is mounted on a shaft 58. The shafts 58 are disposed on opposite sides of the feed screw 48, and each has its axis of rotation oriented in a generally perpendicular direction relative to that of the feed screw 48.

Figure 3:
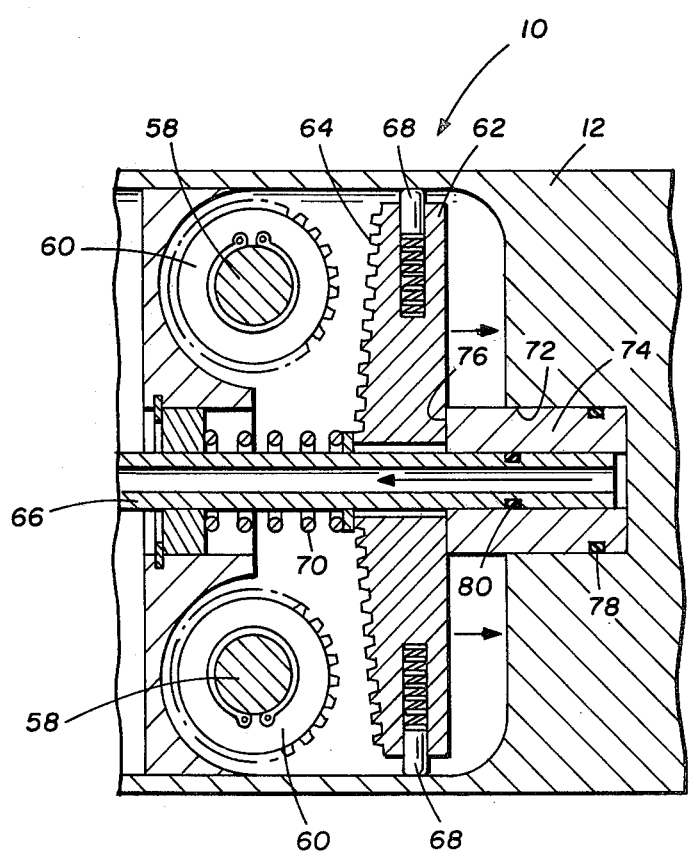
FIG. 3 is a further enlarged, fragmentary cross-sectional view of a portion of the positive feed drill of FIG. 1, illustrating in more detail the positive locking means that is constructed in accordance with the invention.

Referring now to FIG. 3, the shafts 58 are seen from the opposite side of the drill 10. As shown therein, gears 60 are mounted on each of the shafts 58 and the gears 60 are not in mesh with any other gear and, thus, they are free to rotate. It should be pointed out, however, that both the gears 56 and 60 are securely attached to the shaft 58 and will rotate therewith. As presently described, rotation of the feed screw 48 causes rotation of the shafts 58 and the gears 56 and 60. Accordingly, there is no fulcrum or fixed point for the external thread 50 on the feed screw 48 to cause the feed screw 48 to move axially in the housing 10.

Also located in the housing 12, adjacent to the gear 60, is a rack gear 62 having teeth 64 thereon that are sized and arranged to mate or mesh with the teeth on the gear 60. The rack gear 62 is slidably mounted on a gas supply tube 66, which is in fluid communication with the valve 30. Spring biased plungers 68 are provided at each end of the rack gear 62 so that the rack gear 62 remains substantially centered on the tube 66.

The rack gear 66 is normally maintained in the position illustrated in FIG. 3 and out of engagement with the gears 60 by a spiral spring 70 that encircles the gas supply tube 66. One end of the spring 70 is in engagement with the housing 12 and the opposite end is in engagement with the rack gear 62.

The gas tube 66 extends into a cylinder 72 formed in the housing 12. Slidably located in the cylinder 72 is an annular piston 74 that has one end 76 in engagement with the rack gear 62 on the opposite side thereof relative to the spring 70. A seal 78 encircles the piston 74 forming a fluid-tight, slidable seal between the piston 74 and the housing 12. A seal 80 encircles the gas tube 66 forming a slidable, fluid-tight seal with the inner surface of the annular piston 74.

OPERATION OF THE PREFERRED EMBODIMENT

When it is desired to operate the drill 10, the housing 12 would be affixed by jigs or fixtures (not shown) to situate the drill 10 in a fixed relation relative to the material that is to be drilled. An appropriate tool will be inserted in the tool holder 14. Energy supplied to the motor 16 causes rotation of the tool holder 14 through the gear train 18 as previously described.

Figure 4:
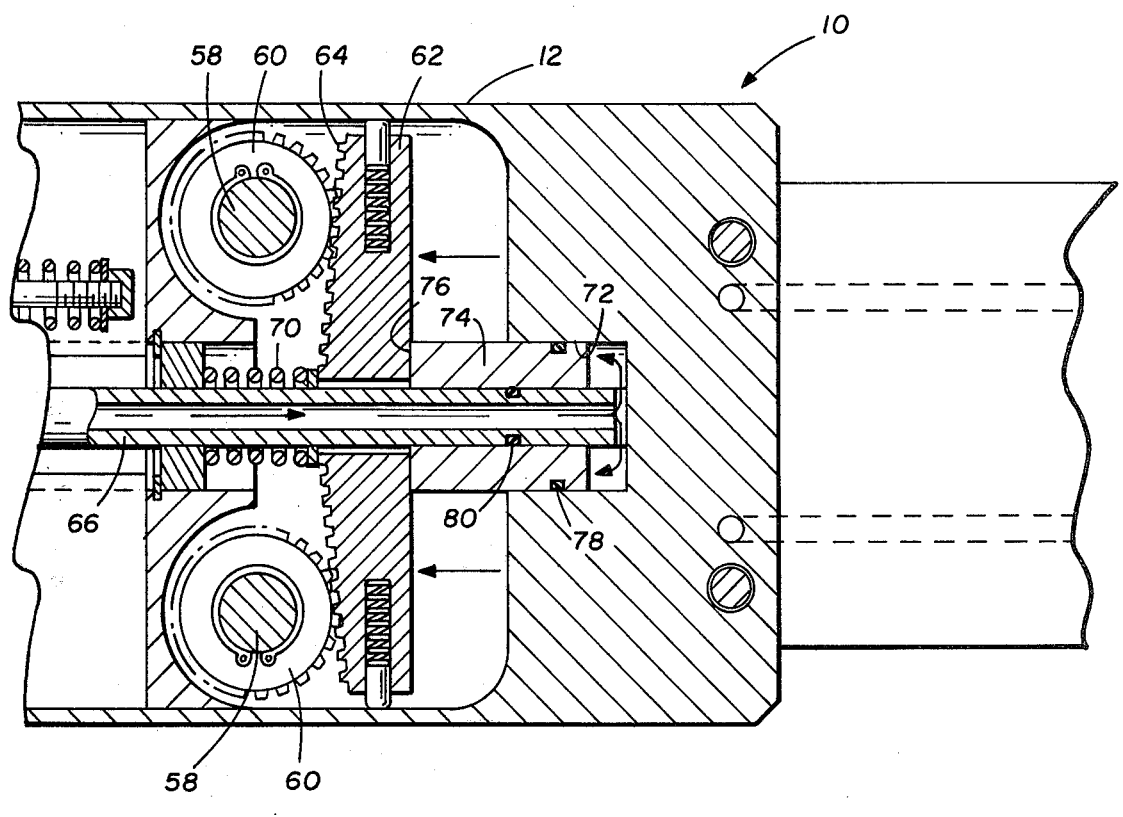
FIG. 4 is a view similar to FIG. 3 but illustrating the improved locking means in another operating position.

Compressed air supplied to the cylinder 20 causes a rapid advance of the tool holder 14 toward the material that is to be drilled. Upon reaching the work piece, the valve 30 is actuated delivering compressed air to the air supply tube 66 shown in FIGS. 3 and 4. The compressed air passing from the supply tube 66 enters the cylinder 72 in the housing 12 driving the piston 74 outwardly of the cylinder and moving the rack gear 62 into engagement with the gears 60. The gears 60, which are rotating as a result of rotation of the feed screw 48 and the gears 56, are stopped upon engagement with the teeth 64 of the rack gear 62. Further rotation of the shaft 58 and the gears 56 is prevented.

When the rotation of the gears 56 stops, a fulcrum is provided upon which the thread 50 acts causing the rotation feed screw 48 to move axially relatively out of the housing 12, carrying the tool holder 14 therewith and either drilling, reaming or counterboring the work piece as desired. It will, of course, be understood that the rate of axial movement of the feed screw 48, is proportional to the lead or pitch of the thread 50 and the rotational speed thereof.

As previously mentioned in connection with the description of the prior art, when the drill bit dulls or snags upon penetrating the work piece, or if the work piece is of extremely tough material, relatively high loads are imposed on the gears 56. Since the gears are positively locked by the rack gear 62 against rotation, the rate of feed will be constant so long as the motor 16 is of sufficient horsepower to rotate the feed screw 48. With the previously described brake-type system for locking the gears 56, it is possible that the shafts 58 may slip resulting in stalling of the axial movement of the screw or severely changing the rate of axial movement of the tool may result.

Upon reaching the desired depth, that is, upon reaching the desired axial movement of the tube holder 14 during the relatively slow feed phase of the feed screw 48, a valve (not shown) is actuated releasing the pressure in the supply tube 66 and the cylinder 72, so that the spring 70 drives the rack gear 62 out of engagement with the gears 60 as shown in FIG. 3. The gears 56 are thus released for rotation during the return movement of the tool holder 14 and the feed screw 48 into the housing 12.

From the foregoing, it will be seen that the improved locking means provided by this invention provides a positive means of assuring that the feed rate of the feed screw 48 will remain substantially constant despite the load encountered by the drill 10 and that the possibility of stalling due to failure of the locking system, is eliminated.

The foregoing detailed description is presented by way of example only and it will be understood that many changes and modifications can be made thereto without departing from the spirit of the invention.

The embodiments of the invention in which an exclusive property or privilege is claimed are defined as follows:

1. In a positive feed drill including a housing, an externally threaded hollow feed screw rotatably and telescopically carried by the housing, and drill tool holder means rotatable with respect to the housing and feed screw arranged to be extended by the feed screw, improved locking means for causing axial movement of the feed screw and tool holder relative to the housing, comprising:
   a shaft journaled in the housing and oriented therein generally perpendicularly with respect to the feed screw;
   thread engaging means in engagement with the external thread on the feed screw, said thread engaging means being mounted on said shaft and rotatable therewith;

a toothed gear mounted on said shaft and rotatable therewith;

non-rotatable gear means having teeth thereon for mating with said toothed gear, said non-rotatable gear means being movable in the housing between a first position wherein said teeth are not in mating engagement and a second position wherein said teeth are in mating engagement thereby preventing rotation of said shaft and causing said feed screw and tool holder to move axially relative to the housing; and means in the housing for moving said non-rotatable gear means between said positions, said means including:

a pressure-responsive piston having one end in engagement with said non-rotatable gear for moving said non-rotatable gear into said second position, a fluid supply tube located in the housing and said piston is annular and slidingly and sealingly encircles a portion of said supply tube, said non-rotatable gear means is slidingly located on said supply tube, a spring having one end engaging the housing and the other end engaging said non-rotatable gear for moving said non-rotatable gear into said first position, and said spring encircles a portion of said supply tube on the opposite side of said non-rotatable gear means relative to said piston.

2. In the positive feed drill of claim 1 and also including:

a second shaft journaled in the housing and located therein in generally parallel relationship to said first-mentioned shaft, said second shaft being located on opposite side of the feed screw from said first mentioned shaft;

second thread engaging means in engagement with the external thread on the feed screw, said second thread engaging means being mounted on said second shaft and rotatable therewith;

a second toothed gear mounted on said second shaft and rotatable therewith; and, said non-rotatable gear means being movable in the housing between said first position and said second position and when in said second position engaging the teeth thereon with the mating teeth on said first and second toothed gears preventing rotation of both said thread engaging means.

3. In the positive feed drill of claim 1 wherein said non-rotatable gear means includes:

an elongated rack gear having teeth on the side thereof adjacent said spring; and resilient guide means on said rack gear in sliding engagement with the housing for maintaining said rack gear relatively centered on said supply tube.

* * * * *